Figure 1:
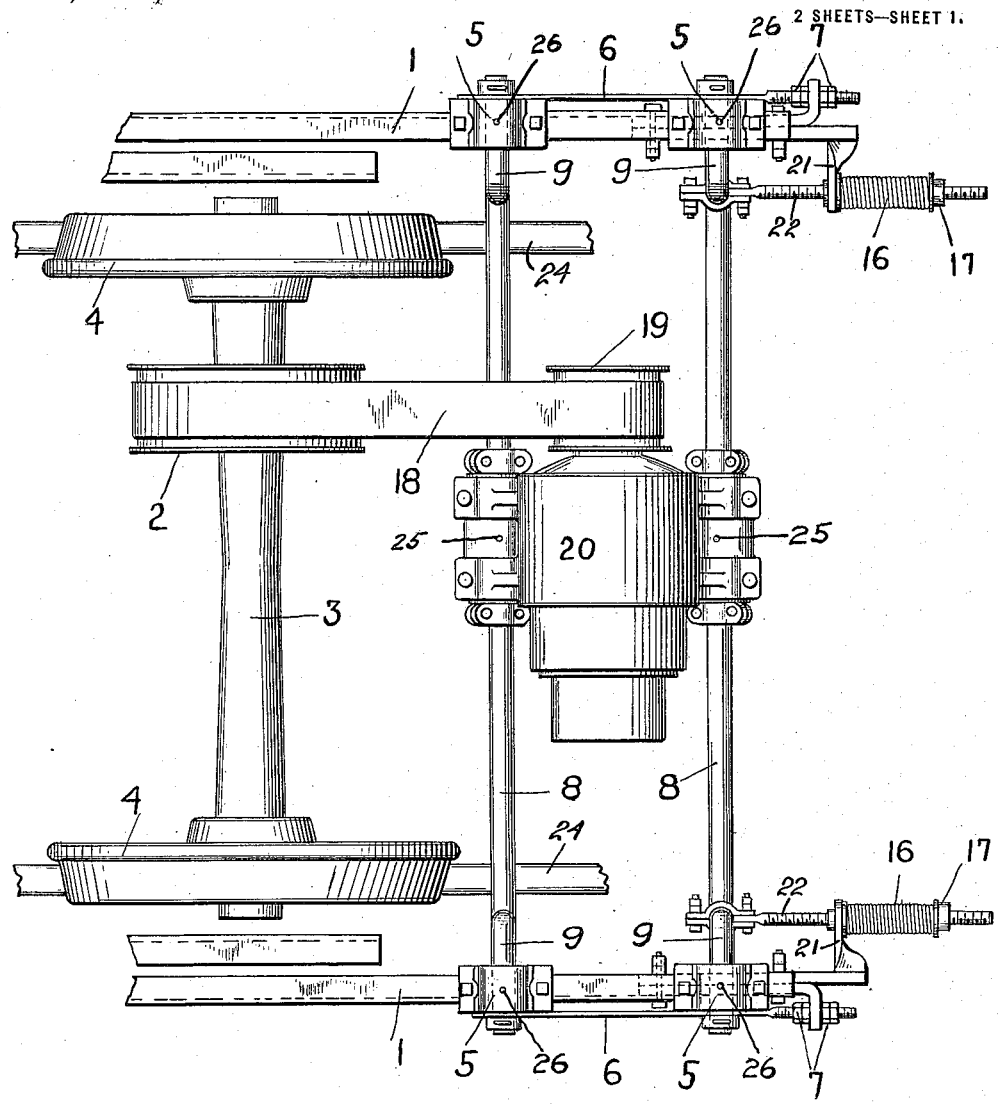

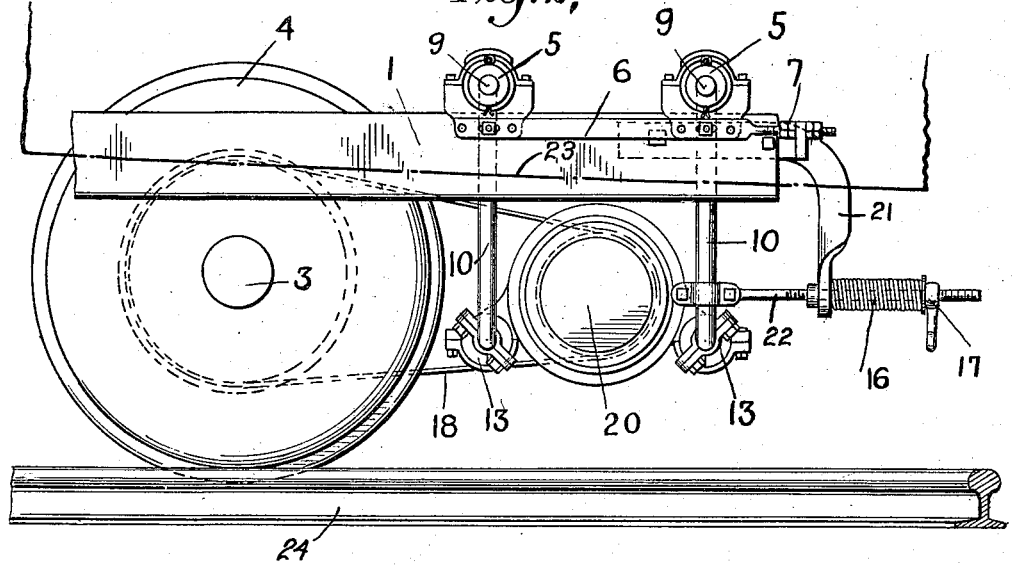
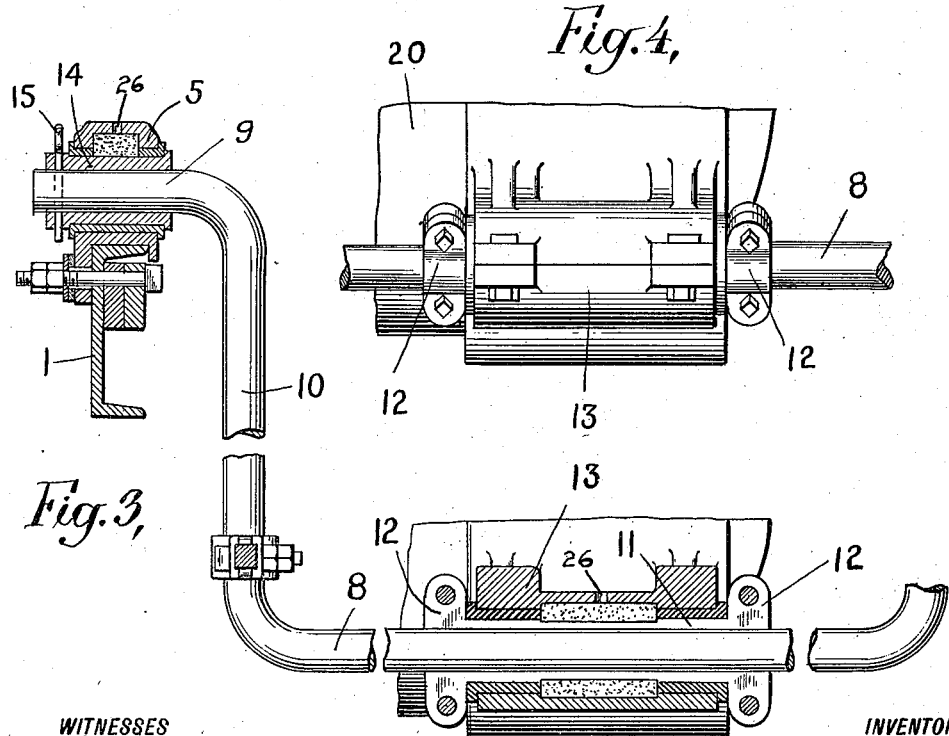

UNITED STATES PATENT OFFICE.

PATRICK KENNEDY, OF BROOKLYN, NEW YORK, ASSIGNOR TO CONSOLIDATED RAILWAY ELECTRIC LIGHTING AND EQUIPMENT CO., OF NEW YORK, N. Y., A CORPORATION OF MAINE.

DYNAMO SUSPENSION ON CAR-TRUCKS.

1,159,046.   Specification of Letters Patent.   Patented Nov. 2, 1915.

Application filed November 19, 1913. Serial No. 801,769.

*To all whom it may concern:*

Be it known that I, PATRICK KENNEDY, a citizen of the United States, residing at No. 177 Putnam avenue, Brooklyn, county of Kings, State of New York, have invented certain new and useful Improvements in Dynamo Suspension on Car-Trucks; and I do hereby declare the following to be a full, clear, and exact description of the invention, such as will enable others skilled in the art to which it appertains to make and use the same.

In mounting a dynamo on a car truck, especially an axle driven car lighting generator, it has heretofore been customary to provide longitudinal members attached to and extending beyond the outer end of the truck to support the dynamo either by hanging it from above or supporting it from below on pivots on which it swings toward and away from the axle or on rails on which it slides, the result being that the dynamo partakes of all the movements of the truck and is easily fitted with devices for automatically and manually regulating the tension of the driving belt. In these cases the longitudinal members are usually reinforced with brackets, cross-beams, outriggers, and the like, for supporting the suspension and the dynamo under the severe conditions of vibration and shock to which they are subjected in railway operation. Such construction is, however, unsuitable in many applications wherein there is provided on the bottom of the car body a longitudinal center sill, forming in effect the "backbone" of the car structure, as is the case in steel passenger coaches, and also wherein the required clearance above the top of the service rails is such as to preclude the possibility of lowering the dynamo from its suspension relatively to the truck to provide for the swinging and other movements of the center sill.

In accordance with the invention herein disclosed, not only do I provide a dynamo suspension well adapted for axle driven generators on steel passenger coaches, as well as on other kinds of cars, but, I also provide a simplified arrangement wherein the brackets, cross-beams, outriggers, etc., are dispensed with and wherein, if desired, the dynamo suspension may be utilized as the end sill to thereby do away with the end sill heretofore provided at the dynamo end of the truck. I accomplish these features by extending the side sills of the truck sufficiently to support the dynamo in position to be driven from the axle, and between these extensions I support a dynamo suspension having transverse members arranged across the truck and connected to the dynamo at places intermediate of the height thereof, so that all space above the dynamo is available for the accommodation of the center sill of the car, while at the same time neither the dynamo nor the dynamo suspension need project below the required clearance line. The structure thus secured may easily be made sufficiently rigid and strong to render the usual end sill at the dynamo end of the truck unnecessary if desired.

While the ideas hereinbefore disclosed may be embodied in various forms of construction in car trucks, yet I prefer to pivot the dynamo suspension on the truck, and more specifically to hang it in bearings carried at adjustable position by the extended side sills, in order that the devices for automatically and manually regulating the belt tension of the general form now prevalent may be associated with my dynamo suspension. Furthermore, I prefer to use the parallel-link swinging-suspension hereinafter described wherein the portions of the links extending across the truck are journaled in bearings carried by the dynamo intermediate of its height so that the dynamo is capable of swinging toward and away from the axle in movements of substantial parallel translation.

In the accompanying drawings illustrating this preferred form of my invention in application to generators driven by a belt from the axle for a car lighting system, as an example;

Figure 1 represents a top plan view of the dynamo suspension and a part of the truck, wherein the usual end sill at that end of the truck is not shown, but may be provided if desired; Fig. 2 represents a side elevation of Fig. 1; Fig. 3 represents an enlarged view, partly in section and partly in elevation, particularly showing a bearing for the suspension and a bearing for the dynamo; and Fig. 4 represents an enlarged front elevation of the dynamo bearing.

The truck illustrated in the drawings is of the structural steel swivel type suitable for railroad cars, and is provided with longitudinal extensions integral with the side sills 1 and unsupported by brackets, cross-beams, outriggers, or the like, other than the suspension and dynamo. The side sills are outside of the wheels and are extended on the dynamo end of the truck for a distance from the axle beyond the location of the usual end sill. The driving pulley 2 is fastened on the rotatable truck axle 3 which carries the wheels 4 in the well known way. Two suspension bearings 5 are mounted on each side sill on respective frames 6, each of which is adapted to be individually adjusted in position toward or from the axle by means of the nuts 7. The suspension for the dynamo 20 comprises two parallel cradle bars journaled in the suspension bearings 5, each cradle bar comprising a lower horizontal portion 8 extending across the truck, an upper horizontal portion 9 at each end forming a journal, and a vertical portion 10 at each end connecting the upper and lower horizontal portions.

A journal sleeve 11 having the terminal ears 12 is tightly clamped on each cradle bar, and a dynamo is provided with bearings 13 for the journal sleeves at places intermediate of the height of the dynamo. In this way sidewise movement of the dynamo is prevented, while the cradle bars may turn in the dynamo bearings. The journal sleeves 14 are fastened on the end portions of the cradle bars by the cotter pins 15 so as to turn in the suspension bearings 5. The dynamo bearings 13 and the suspension bearings 5 are provided with individual oiling holes 25 and 26, respectively, to provide for adequate and convenient lubrication.

The adjustable springs 16 automatically regulate the belt tension to take care of momentary fluctuations by swinging the dynamo suspension and dynamo in the bearings 5, one end of each of these springs acting against a member 21 rigidly fixed to the truck as shown, while the other end presses against the adjustable nut 17 on the rod 22 which is connected to the vertical portion 10 of the dynamo suspension. The dynamo suspension, and therefore the dynamo, may be moved toward or away from the axle at will by means of the nuts 7, so that a shorter or longer belt 18 may be accommodated, and so that the axles of the truck and dynamo may be horizontally alined. Vertical alinement of these axles may be obtained by placing shims under these frames, or in any other suitable way.

It will be understood that upon movement relatively to the axle, the cradle suspension swings in the suspension bearings and turns in the dynamo bearings so that the dynamo is given movements of substantially parallel translation toward and from the axle, thus accommodating its position freely to the momentary fluctuations of the tension of the belt which drives the armature pulley 19 from the axle pulley 2. Furthermore, the suspension is of material of such section and dimensions as to afford the necessary rigidity and strength to the truck without the usual reinforcing members such as auxiliary brackets, cross-beams, outriggers, etc., and may even be made sufficiently rigid as to render unnecessary also the use of the usual end sill at this end of the truck, if desired.

The position in elevation of the center sill of the car body is indicated in Fig. 2 by the broken line 23. The foregoing arrangement is such that there is sufficient clearance below the bottom of this center sill to provide for all vertical and swinging movements of the center sill. Furthermore, the construction is such that with a standard size generator used for car lighting systems on railway coaches, there is sufficient clearance above the top of the service rails 24 to meet the present requirements.

Having thus described my invention, what I claim is:

1. The combination with a car truck having extended side sills and suspension bearings mounted thereon, and a dynamo adapted to be driven from the axle of the truck; of a parallel-link cradle-suspension journaled in said bearings and also journaled in bearings carried by the dynamo for swinging the dynamo toward and from the axle in movements of substantial parallel translation; said suspension having two cradle bars each with a lower horizontal portion extending across the truck through a dynamo bearing, upper horizontal end portions forming the suspension journals, and vertical portions connecting the upper and lower horizontal portions; substantially as described.

2. The combination with a car truck having extended side sills and suspension bearings mounted thereon, means for adjusting the bearings on the individual side sills in position toward and from the axle of the truck, and a dynamo adapted to be driven from the axle of the truck by a belt; of a parallel-link cradle-suspension journaled in said bearings and also journaled in bearings carried by the dynamo for swinging the dynamo toward and from the axle in movements of substantial parallel translation; said suspension having two cradle bars each with a lower horizontal portion extending across the truck through a dynamo bearing, upper horizontal end portions forming the suspension journals, and vertical portions connecting the upper and lower horizontal positions; substantially as described.

3. The combination with a car truck having extended side sills and suspension bearings mounted thereon, and a dynamo adapted to be driven from the axle of the truck by a belt; of a parallel-link cradle-suspension journaled in said bearings and also journaled in bearings carried by the dynamo for swinging the dynamo toward and from the axle in movements of substantial parallel translation; and an automatic tensioning device fastened to the truck and to the suspension for automatically regulating the belt tension; said suspension having two cradle bars each with a lower horizontal portion extending across the truck through a dynamo bearing, upper horizontal end portions forming the suspension journals, and vertical portions connecting the upper and lower horizontal portions; substantially as described.

4. The combination with a car truck having extended side sills and suspension bearings mounted thereon, means for adjusting the bearings on the individual side sills in position toward and from the axle of the truck, and a dynamo adapted to be driven from the axle of the truck by a belt; of a parallel-link cradle-suspension journaled in said bearings and also journaled in bearings carried by the dynamo for swinging the dynamo toward and from the axle in movements of substantial parallel translation; said suspension having two cradle bars each with a lower horizontal portion extending across the truck through a dynamo bearing, upper horizontal end portions forming the suspension journals, and vertical portions connecting the upper and lower horizontal portions; and a spring pressed member fastened to the side sill of the truck and to a cradle bar of the suspension for automatically regulating the belt tension; substantially as described.

5. The combination with a car truck having suspension bearings carried by longitudinal extensions of the side sills, and a dynamo adapted to be driven from the axle of the truck; of a parallel-link cradle-suspension journaled in said bearings and also journaled in bearings carried by the dynamo intermediate of its height for swinging the dynamo toward and from the axle in movements of substantial parallel translation; said suspension having two cradle bars each with a lower horizontal portion extending across the truck through a dynamo bearing, upper horizontal end portions forming the suspension journals, and vertical portions connecting the upper and lower horizontal portions; substantially as described.

In testimony whereof I affix my signature, in presence of two witnesses.

PATRICK KENNEDY.

Witnesses:
J. L. WATSON,
F. R. GRAATS.